(No Model.)
P. SLATTERY.
SCREW DRIVING MECHANISM FOR BALING PRESSES AND OTHER USES.
No. 291,791. Patented Jan. 8, 1884.
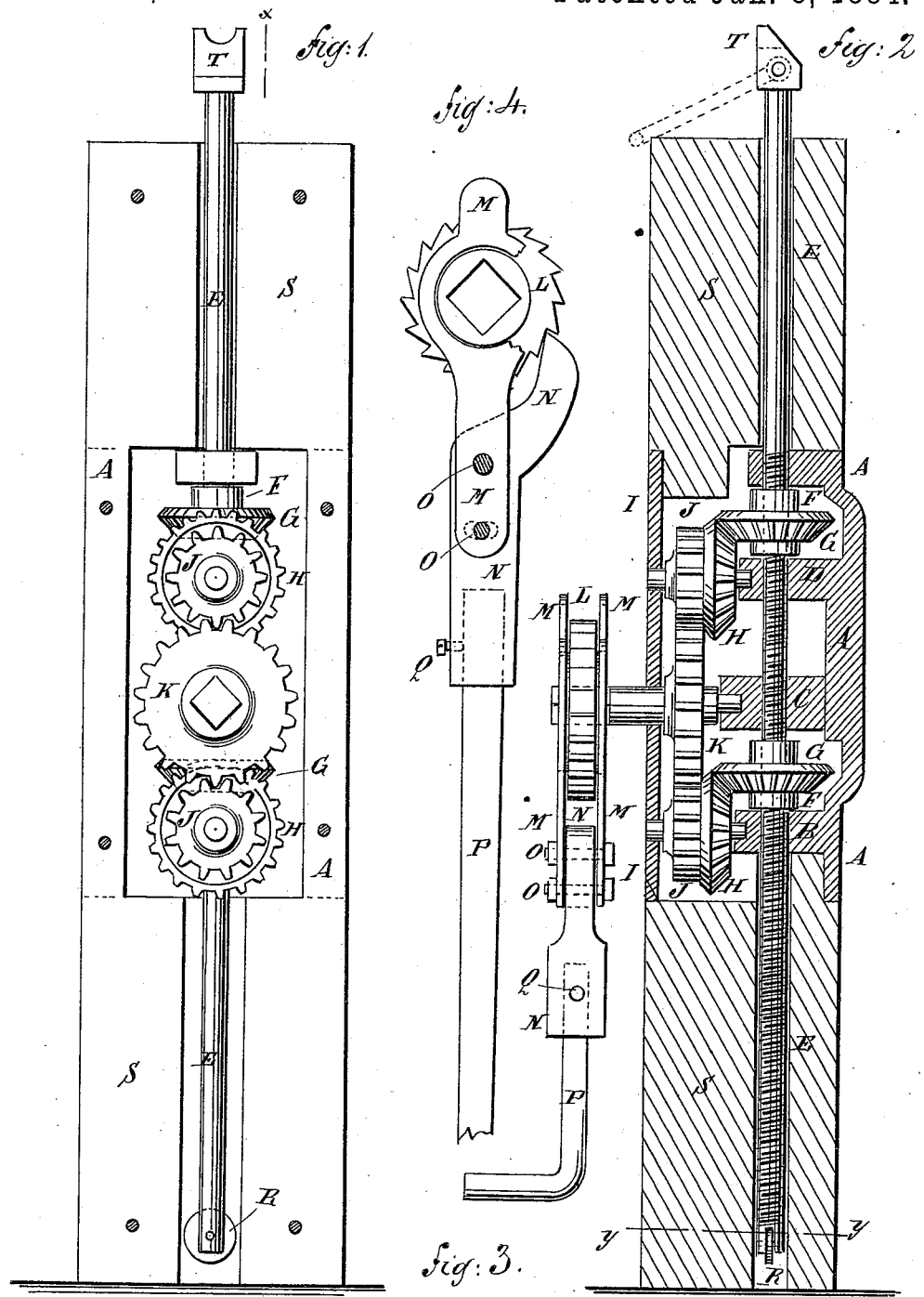
WITNESSES:
Chas. Nixon
C. Sedgwick
INVENTOR:
P. Slattery
BY Munn & Co
ATTORNEYS.

UNITED STATES PATENT OFFICE.

PATRICK SLATTERY, OF CHARLESTON, SOUTH CAROLINA.

SCREW-DRIVING MECHANISM FOR BALING-PRESSES AND OTHER USES.

SPECIFICATION forming part of Letters Patent No. 291,791, dated January 8, 1884.

Application filed August 23, 1883. (No model.)

*To all whom it may concern:*

Be it known that I, PATRICK SLATTERY, of Charleston, in the county of Charleston and State of South Carolina, have invented a new and useful Improvement in Screw-Driving Mechanisms for Baling-Presses and other Uses, of which the following is a full, clear, and exact description.

Reference is to be had to the accompanying drawings, forming a part of this specification, in which similar letters of reference indicate corresponding parts in all the figures.

Figure 1 is a front elevation of my improvement, the cap-plate being removed. Fig. 2 is a sectional side elevation of my improvement, taken through the line $xx$, Fig. 1. Fig. 3 is a sectional plan view of the same, taken through the line $yy$, Fig. 2. Fig. 4 is a front elevation of the ratchet-pawl lever, parts being broken away.

The object of this invention is to provide a convenient and effective mechanism for operating screws for baling cotton, stowing cotton bales in vessels, and for other uses where great power is required.

The invention consists in a screw-driving mechanism, constructed with a box through which passes a screw provided with two nuts connected by two sets of gear-wheels with an intermediate gear-wheel, to which power is applied by a ratchet pawl lever, as will be hereinafter fully described.

A represents an iron box, which is cast with inward projections, B C D, perforated for the passage of the screw E.

Upon the screw E, between the projections B C and between the projection D and the forward end of the box A, are placed nuts F, upon which are formed beveled-gear wheels G.

Into the teeth of the beveled-gear wheels G mesh the teeth of the beveled-gear wheels H, the journals of which revolve in bearings in the projections B D and in the cap-plate I of the box A.

Upon the beveled-gear wheels H are formed, or with them are rigidly connected, gear-wheels J, into the teeth of which mesh the teeth of the intermediate gear-wheel, K. The journals of the gear-wheel K revolve in bearings in the projection C and cap-plate I, and the outer journal projects and has its end squared to fit into the square bore of the hub of the ratchet-wheel L.

The ends of the hub of the ratchet-wheel L revolve in bearings in two plates, M, the ends of which are secured to the opposite sides of the pawl N by two bolts, O. The hole in the pawl N for the outer bolt, O, is elongated, as indicated in dotted lines in Fig. 4, to give the engaging end of the pawl sufficient play to pass over the teeth of the ratchet-wheel L when drawn back for another stroke. The forward end of the pawl N is curved outward and forward, as shown in Fig. 4, to bring it into proper position to act upon the teeth of the ratchet-wheel L.

In the outer end of the shank of the pawl N is formed a socket to receive the end of the lever P, which is secured in place by a set-screw, Q, or other suitable means, so that the said lever can be readily attached and detached, as may be required.

The pawl N and lever P can be made in one piece, if desired; but I prefer the construction first described, as it enables a short lever, P, to be used, as shown in Fig. 2, when more speed and less power are required, and a long lever, P, to be used, as shown in Fig. 4, when more power and less speed are required. The rear end of the screw E is slotted, and to it is pivoted a friction-wheel, R, of a little greater diameter than the said screw. The wheel R rolls along grooves in the opposite sides of the aperture in the guide-blocks S, and relieves the said rear end of the screw E from side friction.

When the mechanism is used for operating the follower of a baling-press, the box A and its attachments are secured to and between two posts of the press-frame, and a clevis is attached to the upper end of the screw E, as indicated in dotted lines in Fig. 2, for convenience in connecting the said screw with the said follower.

When the mechanism is used for stowing cotton-bales in vessels, a head, T, is attached to the forward end of the screw E, to rest against the cotton-bales, and guide-blocks S are attached to the ends of the box A, to cover and protect the said screw and to keep the screw from bending. In this case the rear guide-block S also serves as a foot to rest against the side or frame of the vessel or other support while forcing the cotton-bales into place.

The lever-ratchet can be used for running the screw in the other direction by reversing it upon its journal.

I do not abandon or dedicate to the public any patentable feature set forth herein and not hereinafter claimed, but reserve the right to claim the same either in a reissue of any patent that may be granted upon this application or in other applications for Letters Patent that I may make.

Having thus described my invention, I claim as new and desire to secure by Letters Patent—

1. A screw-driving mechanism constructed substantially as herein shown and described, and consisting of the box A, the screw E, the two nuts F, the two sets of gear-wheels G H J, the intermediate gear-wheel, K, and the ratchet-wheel and pawl-lever L M N P, as set forth.

2. In a screw-driving mechanism, the combination, with the box A and the screw E, of the two nuts F, the two sets of gear-wheels G H J, and the intermediate gear-wheel, K, substantially as herein shown and described, whereby power applied to the said intermediate gear-wheel will be applied to the said screw at two points, as set forth.

3. In a screw-driving mechanism, the combination, with the intermediate gear-wheel, K, of the ratchet-wheel L, the connecting-plates M, and the pawl-lever N P, substantially as herein shown and described, whereby power can be readily applied to the said gear-wheel, as set forth.

4. The ratchet pawl-lever constructed substantially as herein shown and described, and consisting of the ratchet-wheel L, the connecting-plates M, and the pawl-lever N P, as set forth.

PATRICK SLATTERY.

Witnesses:
 JOHN DOYLE,
 WILMOT G. DE SAUPURE, Jr.